United States Patent
Lim et al.

(10) Patent No.: US 11,336,308 B2
(45) Date of Patent: May 17, 2022

(54) APPARATUS AND METHOD FOR DETERMINING REFLECTION COEFFICIENT OF ANTENNA

(71) Applicant: Samsung Electronics Co., Ltd., Gyeonggi-do (KR)

(72) Inventors: Wonsub Lim, Gyeonggi-do (KR); Seunghyun Oh, Gyeonggi-do (KR); Hyoseok Na, Gyeonggi-do (KR); Dongil Yang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 224 days.

(21) Appl. No.: 16/767,225

(22) PCT Filed: Jan. 31, 2019

(86) PCT No.: PCT/KR2019/001319
§ 371 (c)(1),
(2) Date: May 27, 2020

(87) PCT Pub. No.: WO2019/151784
PCT Pub. Date: Aug. 8, 2019

(65) Prior Publication Data
US 2021/0036722 A1    Feb. 4, 2021

(30) Foreign Application Priority Data
Jan. 31, 2018  (KR) ..................... 10-2018-0011902

(51) Int. Cl.
*H03L 7/00* (2006.01)
*H04B 1/00* (2006.01)
(Continued)

(52) U.S. Cl.
CPC ........... *H04B 1/0053* (2013.01); *H01Q 1/243* (2013.01); *H01Q 1/521* (2013.01); *H04B 1/0458* (2013.01); *H04B 1/401* (2013.01)

(58) Field of Classification Search
CPC .... H04B 1/0053; H04B 1/0458; H04B 1/401; H04B 1/18; H04B 17/10; H04B 17/12;
(Continued)

(56) References Cited

U.S. PATENT DOCUMENTS 8,872,720 B2   10/2014   Bae
9,438,319 B2    9/2016   Greene
(Continued)

FOREIGN PATENT DOCUMENTS

KR      2002-0068967 A    8/2002
KR   10-2011-0017107 A    2/2011
(Continued)

OTHER PUBLICATIONS

Korean Search Report dated Sep. 8, 2021.

*Primary Examiner* — Richard Tan
(74) *Attorney, Agent, or Firm* — Cha & Reiter, LLC

(57) ABSTRACT

Disclosed is an electronic device. Other various embodiments as understood from the specification are also possible. The electronic device may include an antenna, a communication module including a transceiver, and a control circuit. The control circuit may be configured to radiate a first signal generated from the transceiver through the antenna, to obtain at least part of a second signal obtained by combining a forward signal delivered from the communication module to the antenna and a reverse signal reflected from the antenna, and to determine a reflection coefficient for the antenna based on at least part of the first signal and at least part of the second signal.

15 Claims, 7 Drawing Sheets

(51) Int. Cl.
*H01Q 1/24* (2006.01)
*H01Q 1/52* (2006.01)
*H04B 1/04* (2006.01)
*H04B 1/401* (2015.01)

(58) Field of Classification Search
CPC ...... H04B 17/103; H04B 1/006; H01Q 1/243; H01Q 1/521; H01Q 5/50
USPC .......................................................... 331/16
See application file for complete search history.

(56) References Cited

U.S. PATENT DOCUMENTS

| | | |
|---|---|---|
| 9,523,727 B2 | 12/2016 | Han et al. |
| 2010/0239047 A1 | 9/2010 | Takayashiki |
| 2011/0116404 A1 | 5/2011 | Shimizu |
| 2016/0352408 A1 | 12/2016 | Greene |
| 2018/0262257 A1 | 9/2018 | Greene |

FOREIGN PATENT DOCUMENTS

| | | |
|---|---|---|
| KR | 10-1294380 B1 | 8/2013 |
| KR | 10-2014-0075959 A | 6/2014 |
| KR | 10-2015-0143733 A | 12/2015 |
| KR | 10-2017-0037913 A | 4/2017 |

APPARATUS AND METHOD FOR DETERMINING REFLECTION COEFFICIENT OF ANTENNA

CROSS-REFERENCE TO RELATED APPLICATION(S)

This application is a National Phase Entry of PCT International Application No. PCT/KR2019/001319, which was filed on Jan. 31, 2019, and claims priority to Korean Patent Application No. 10-2018-0011902, which was filed on Jan. 31, 2018, the contents of which are incorporated herein by reference.

TECHNICAL FIELD

Embodiments disclosed in this specification relate to an apparatus and a method for determining a reflection coefficient for an antenna.

BACKGROUND ART

In a wireless communication network, an electronic device may measure a reflection coefficient for an antenna to determine whether an antenna is abnormal. The electronic device may improve the performance of the antenna by adjusting the impedance of the antenna depending on the reflection coefficient. In addition to the reflection coefficient, the electronic device may determine whether an antenna is abnormal, through a return loss (RL) or a voltage standing wave ratio (VSWR).

DISCLOSURE

Technical Problem

To identify reflection coefficient, RL, or VSWR, the electronic device may obtain at least part of a signal delivered to an antenna and at least part of a signal reflected from an antenna. The signal delivered to the antenna may be referred to as a "forward signal", and the signal reflected from the antenna may be referred to as a "reverse signal". The electronic device may include a bidirectional coupler to obtain at least part of the forward signal and at least part of the reverse signal. The bidirectional coupler may include two signal lines to separately obtain at least part of the forward signal and at least part of the reverse signal.

In various embodiments of the disclosure, the electronic device may measure the reflection coefficient for the antenna without using the bidirectional coupler.

Technical Solution

According to an embodiment disclosed in this specification, an electronic device may include an antenna, a communication module including a transceiver, and a control circuit. The control circuit may be configured to radiate a first signal generated from the transceiver through the antenna, to obtain at least part of a second signal obtained by combining a forward signal delivered from the communication module to the antenna and a reverse signal reflected from the antenna, and to determine a reflection coefficient for the antenna based on at least part of the first signal and at least part of the second signal.

According to an embodiment disclosed in this specification, a method of an electronic device may include radiating a first signal generated from a transceiver, through an antenna, obtaining at least part of a second signal obtained by combining a forward signal delivered to the antenna and a reverse signal reflected from the antenna, and determining a reflection coefficient for the antenna based on at least part of the first signal and at least part of the second signal.

According to an embodiment disclosed in this specification, an electronic device may include an antenna, a communication module including a transceiver, and a control circuit. The control circuit may be configured to radiate a first signal generated from the transceiver through the antenna, to obtain at least part of one signal among a forward signal delivered from the communication module to the antenna and a reverse signal reflected from the antenna, and to determine a reflection coefficient for the antenna based on at least part of the forward signal and the reverse signal and at least part of the first signal.

Advantageous Effects

According to the embodiments disclosed in this specification, an electronic device may determine a reflection coefficient for an antenna without using a bidirectional coupler by obtaining a signal, which is generated by combining a forward signal and a reverse signal, using one line.

According to the embodiments disclosed in this specification, the electronic device may provide an effect of material cost reduction and mounting space reduction by determining a reflection coefficient for an antenna without using a bidirectional coupler.

Besides, a variety of effects directly or indirectly understood through the disclosure may be provided.

DESCRIPTION OF DRAWINGS

With regard to description of drawings, the same or similar components may be marked by the same or similar reference numerals.

MODE FOR INVENTION

Hereinafter, various embodiments of the disclosure will be described with reference to accompanying drawings. However, those of ordinary skill in the art will recognize that modification, equivalent, and/or alternative on various embodiments described herein can be variously made without departing from the scope and spirit of the disclosure.

Figure 1:
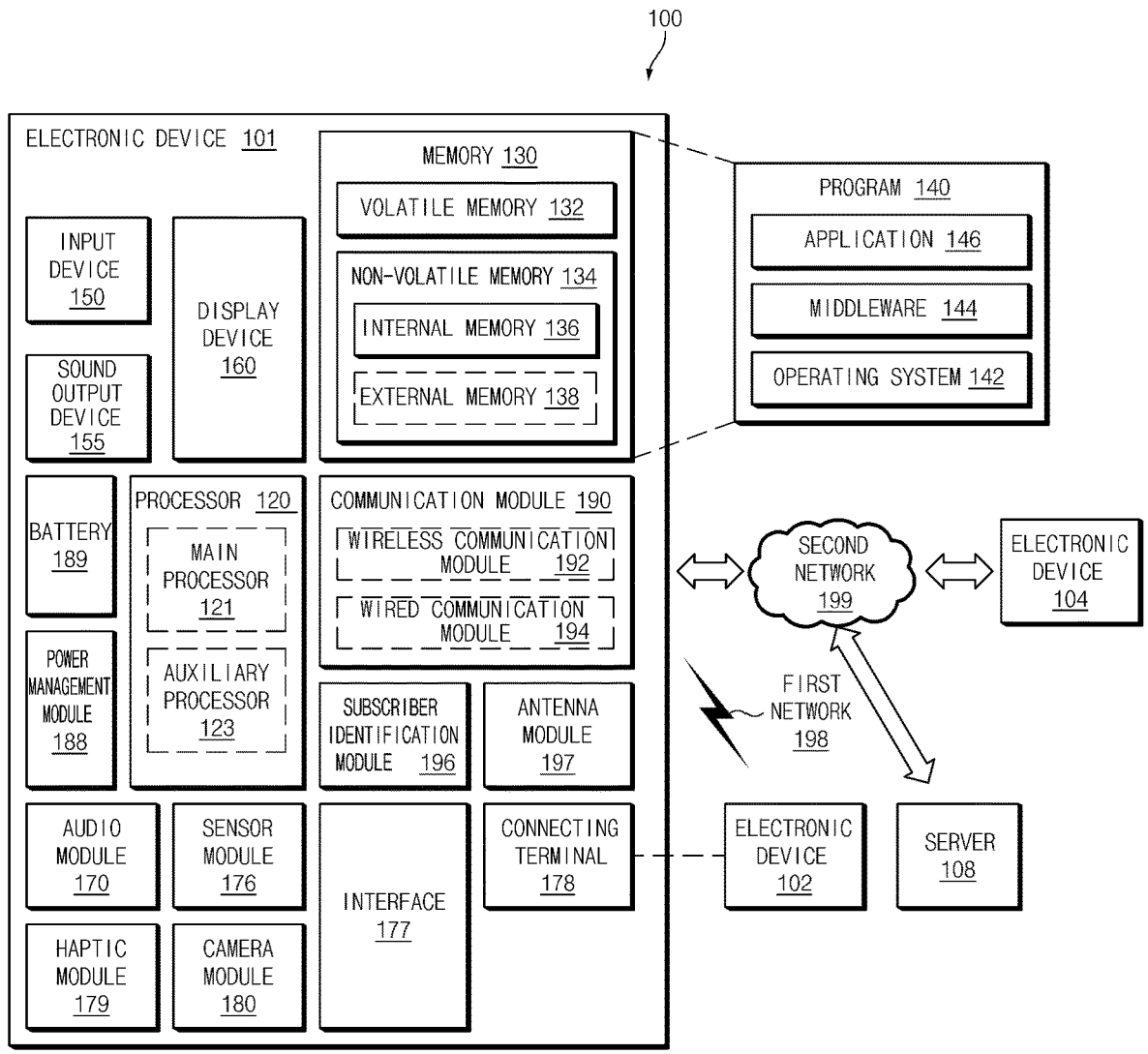
FIG. 1 illustrates a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
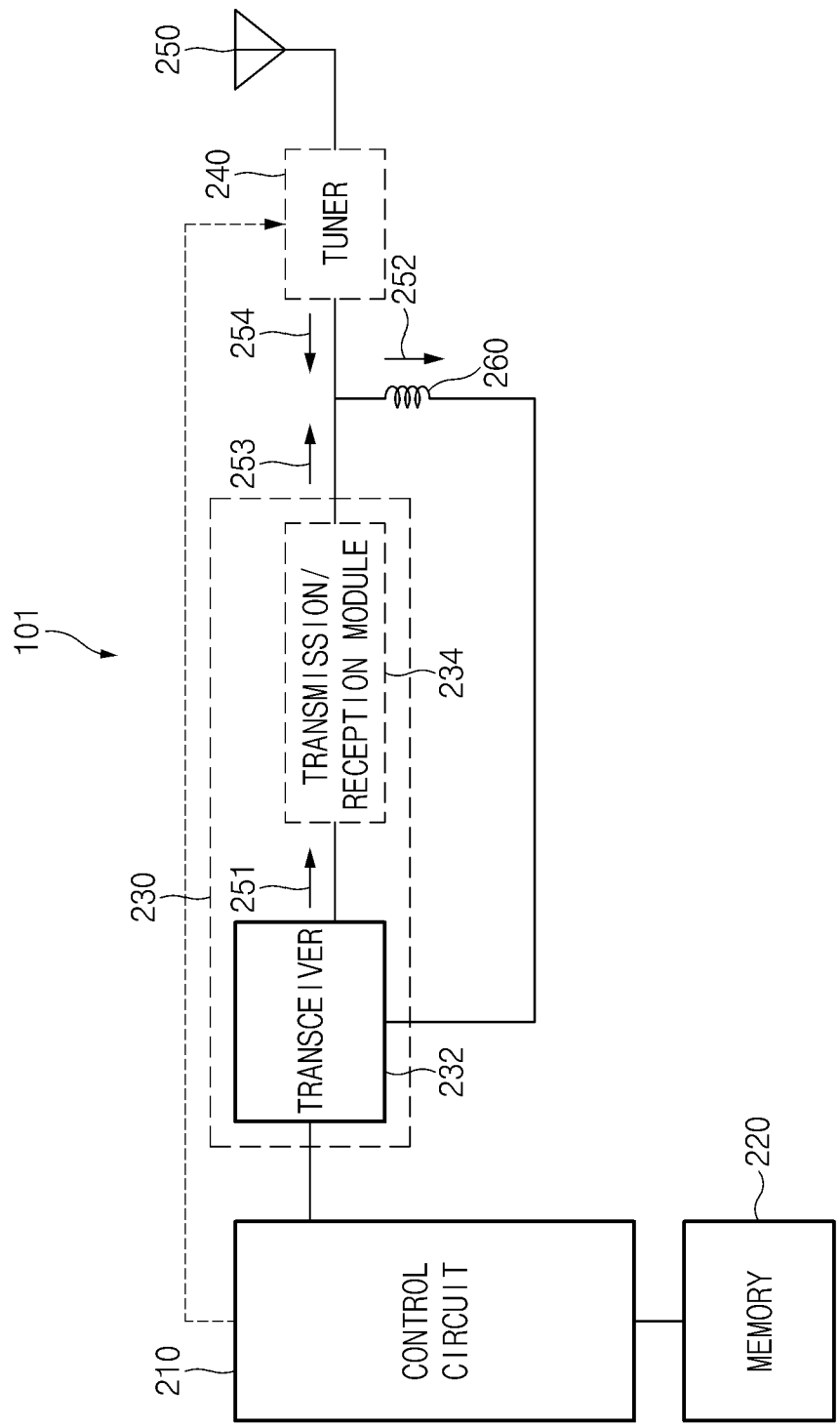
FIG. 2 is a block diagram of an electronic device including a passive element according to various embodiments.

FIG. 2 is a block diagram of an electronic device including a passive element according to various embodiments.

Referring to FIG. 2, the electronic device 101 may include a control circuit 210 (e.g., the processor 120 of FIG. 1), a memory 220 (e.g., the memory 130 of FIG. 1), a communication module 230 (e.g., the communication module 190 of FIG. 1), and an antenna 250 (e.g., the antenna module 197 of FIG. 1). FIG. 2 illustrates one antenna, but the number of antennas 250 is not limited to the number illustrated in FIG. 2. For example, the electronic device 101 may include the plurality of antennas 250.

According to an embodiment, the communication module 230 may include components for processing signals transmitted or received through the antenna 250. For example, the communication module 230 may include a transceiver 232. According to embodiments, the communication module 230 may further include at least another component in addition to the components illustrated in FIG. 2. For example, the communication module 230 may include a communication processor (CP).

According to an embodiment, the transceiver 232 may be a radio frequency (RF) transceiver or an RF integrated circuit (IC). The transceiver 232 may process signals in an RF band. According to an embodiment, the transceiver 232 may be implemented with a system on chip (SoC). For example, the transceiver 232 may modulate a digital signal output from a modem into an RF state. For another example, the transceiver 232 may demodulate the signal received in the RF state into a digital state.

According to an embodiment, the communication module 230 may further include a transmission/reception module 234. The transmission/reception module 234 may be a front end module (FEM) or a front end module including duplexer (FEMID). According to an embodiment, the transmission/reception module 234 may amplify or filter a signal in the RF band. For example, the transmission/reception module 234 may include at least one of a power amplifier (PA), a filter circuit (e.g., a surface acoustic wave (saw) filter), a duplexer, and a switch.

According to an embodiment, the antenna 250 may be a dipole antenna, a monopole antenna, a patch antenna, a horn antenna, a parabolic antenna, a helical antenna, a slot antenna, and a loop antenna, an inverted-F antenna, a planar inverted-F antenna, and the combination thereof. The antenna 250 may transmit or receive a signal in the RF band.

According to an embodiment, the electronic device 101 may further include a tuner 240. For example, the tuner 240 may be interposed between the communication module 230 and the antenna 250. The electronic device 101 may prevent the performance of the antenna 250 from being degraded, by correcting the impedance of the antenna 250 through the tuner 240.

According to an embodiment, the communication module 230 and the antenna 250 may be connected through the transmission path through which a signal is delivered. According to an embodiment, the transmission path may be referred to as a "line". For example, the transmission path may include a coaxial cable path, a microstrip transmission path, a stripline transmission path, an edge-coupled microstrip transmission path, an edge-coupled stripline transmission path, and the combination thereof.

According to an embodiment, the signal generated from the transceiver 232 may be delivered to the antenna 250 through the lines via the transmission/reception module 234 (and the tuner 240). At least part of the signal delivered to the antenna 250 may be radiated through the antenna 250, and the other parts may be reflected from the antenna 250. In this specification, the signal (e.g., reference numeral 251) generated by the transceiver 2302 may be referred to as a first signal. In this specification, the signal (e.g., reference numeral 253) passing through the transmission/reception module 234 may be referred to as a third signal. The third signal may be referred to as a forward signal. In this specification, the signal reflected from the antenna 250 (e.g., reference numeral 254) may be referred to as a fourth signal. The fourth signal may be referred to as a reverse signal.

According to an embodiment, the electronic device 101 may obtain at least part of a signal obtained by combining the third signal and the fourth signal. In this specification, the signal obtained by combining the third signal and the fourth signal may be referred to as a second signal. According to an embodiment, the electronic device 101 may obtain at least part of the second signal (e.g., reference numeral 252) through a passive element 260 interposed between the communication module 230 and the antenna 250 (or the tuner 240). For example, the passive element 260 may include at least one of an inductor, a capacitor, a resistor, a transformer, and a relay. When the passive element 260 includes an inductor, the value of the inductor may be, for example, about 100 nH.

According to an embodiment, the control circuit 210 may be operatively connected to the communication module 230, the memory 220, and the tuner 240. For example, the control circuit 210 may include at least one of an application processor (AP), a communication processor (CP), a modem, and a baseband processor. FIG. 2 illustrates the single control circuit 210, but the control circuit 210 may be at least one. FIG. 2 illustrates the control circuit 210 disposed separately from the communication module 230, but the control circuit 210 may be embedded in the communication module 230 or may be embedded in the transceiver 232.

According to an embodiment, the transceiver 232 may obtain at least part of the second signal through the passive element 260 and may determine a reflection coefficient for the antenna 250 based on at least part of the first signal and at least part of the second signal. According to an embodiment, the reflection coefficient for the antenna 250 may be determined by the control circuit 210 embedded in the transceiver 232.

According to an embodiment, the control circuit 210 may determine the reflection coefficient, using a look-up table indicating a ratio between the first signal and the second signal. The specific example in which the control circuit 210 (or the transceiver 232) determines the reflection coefficient for the antenna 250 based on the second signal is described in FIG. 5. The electronic device 101 may not include a bidirectional coupler required to obtain the third signal and the fourth signal, by determining the reflection coefficient using the second signal.

According to an embodiment, the control circuit 210 may correct the impedance of the antenna 250 through the tuner 240 based on the determined reflection coefficient. For another example, the control circuit 210 may store data in the memory 220 or may load the stored data from the memory 220.

According to an embodiment, the memory 220 may store instructions or data that allows the control circuit 210 to operate. For another example, the memory 220 may store information (e.g., a look-up table) used to determine the reflection coefficient.

Figure 3:
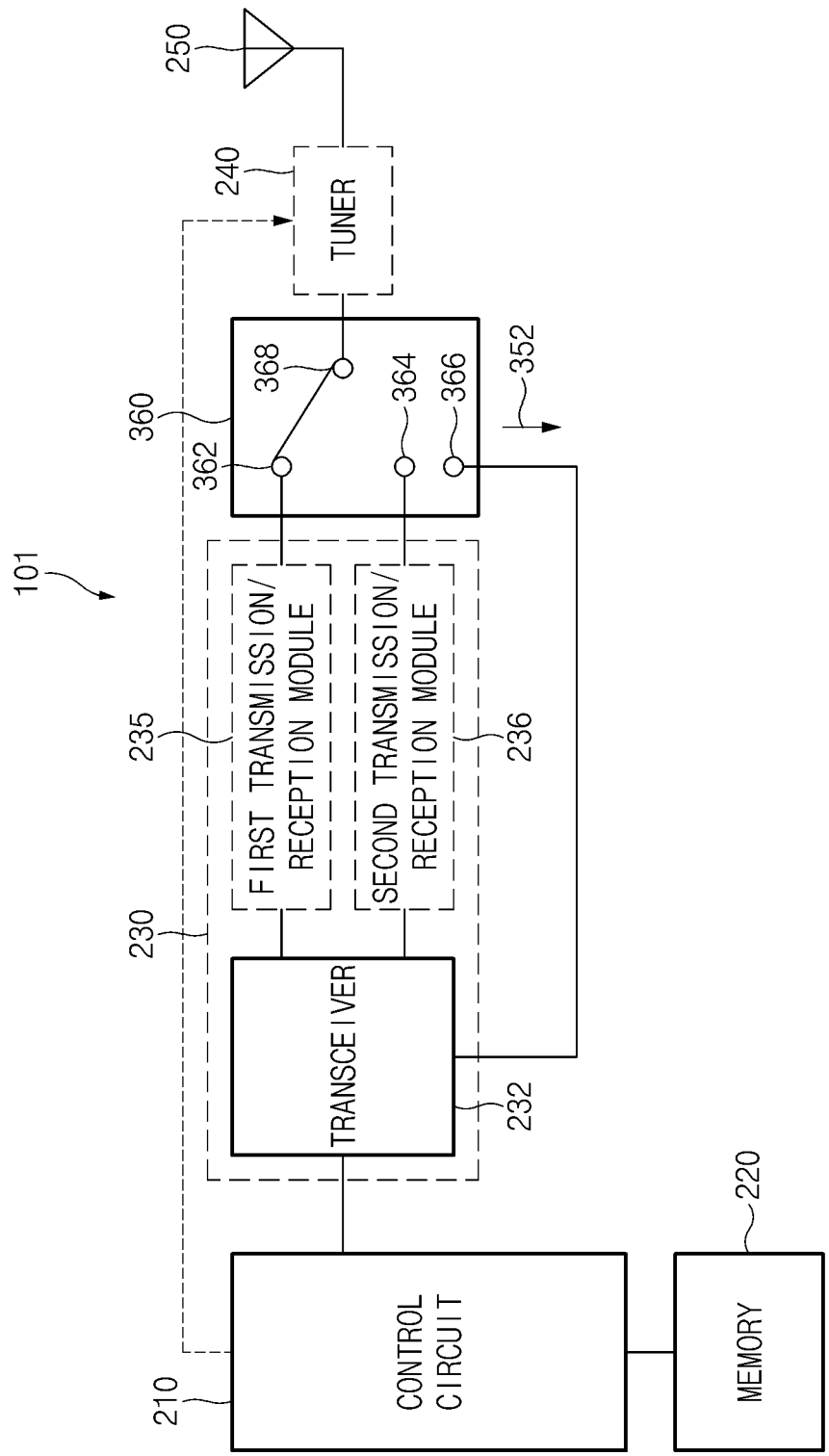
FIG. 3 is a block diagram of an electronic device including a plurality of transmission/reception modules and a switch according to various embodiments.

FIG. 3 is a block diagram of an electronic device including a plurality of transmission/reception modules and a switch according to various embodiments.

Referring to FIG. 3, the communication module 230 may include a first transmission/reception module 235 and a second transmission/reception module 236. FIG. 3 illustrates two transmission/reception modules, but the number of transmission/reception modules is not limited. The communication module 230 may include the number of transmission/reception modules that varies depending on the frequency band supported by the electronic device 101. According to an embodiment, the first transmission/reception module 235 and the second transmission/reception module 236 may process signals in different frequency bands. For example, the first transmission/reception module 235 and the second transmission/reception module 236 may process at least one of LTE frequency bands defined in a 3rd generation partnership project (3GPP). The LTE frequency bands may include frequency bands predetermined by the 3GPP TS 36.101 specification.

According to an embodiment, a switch 360 may be interposed between a plurality of transmission/reception modules 235 and 236 and the antenna 250 (or the tuner 240). According to an embodiment, the switch 360 may include a plurality of ports 362, 364, 366, and 368. According to an embodiment, the first port 362 may be connected to the first transmission/reception module 235; the second port 364 may be connected to the second transmission/reception module 236; the third port 366 may be connected to transceiver 232; and the fourth port 368 may be connected to the antenna 250 or the tuner 240. The control circuit 210 may control the switch 360 such that one transmission/reception module of the first transmission/reception module 235 and the second transmission/reception module 236 is connected to the antenna 250.

According to an embodiment, the transceiver 232 may obtain at least part of the second signal through the third port 366 that is not connected to the transmission/reception modules 235 and 236. For example, at least part (e.g., reference number 352) of the second signal obtained by combining the third signal (e.g., reference numeral 253 in FIG. 2) output from the first transmission/reception module 235 or the second transmission/reception module 236 and the fourth signal (e.g., reference number 254 in FIG. 2) reflected from the antenna 250 may be coupled to a line, to which the third port 366 and the control circuit 210 are connected, by isolation features. The control circuit 210 (or the transceiver 232) may determine the reflection coefficient of the antenna 250 based on at least part of the first signal and at least part of the second signal, which are obtained through the switch 360.

Figure 4:
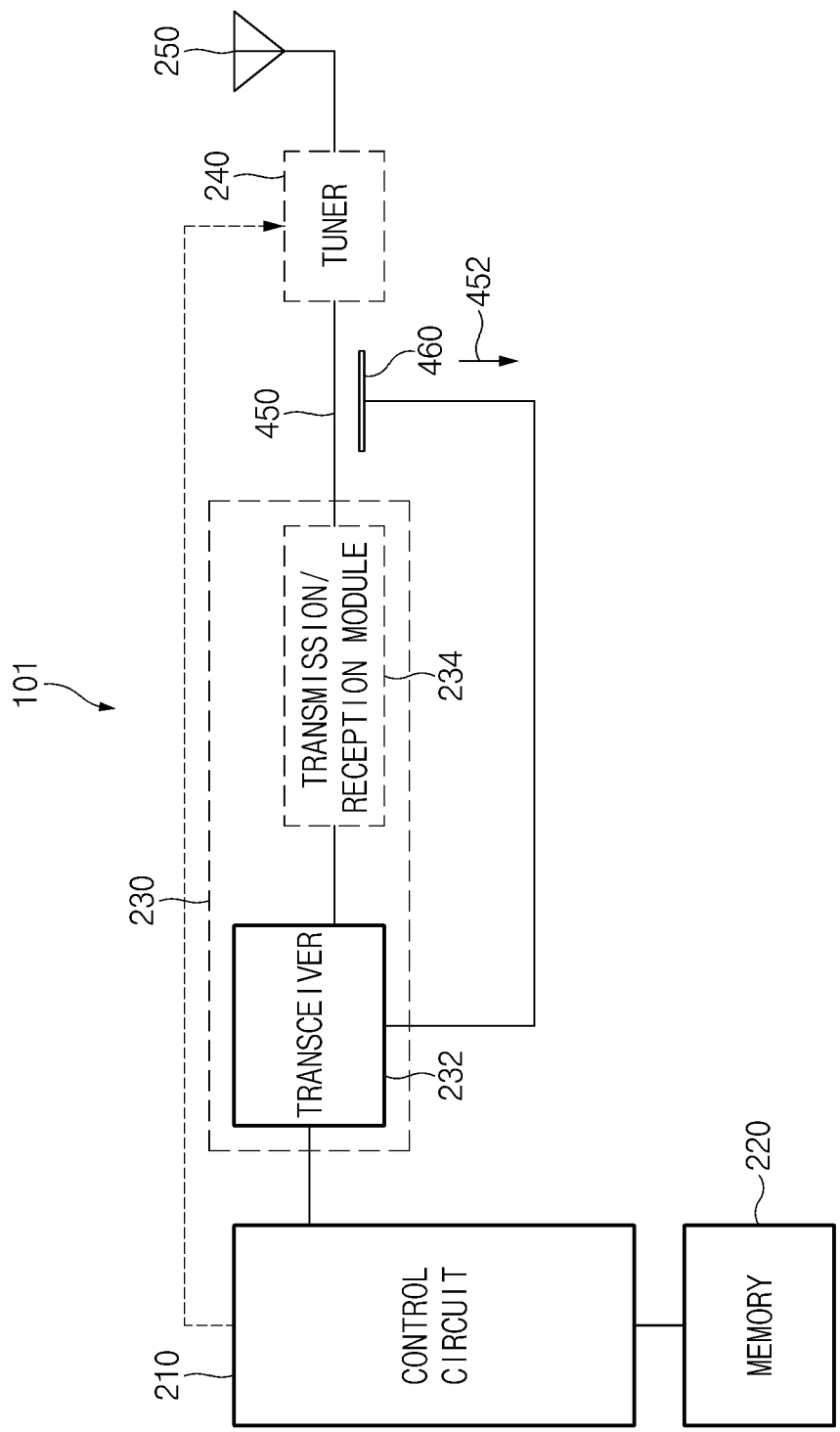
FIG. 4 is a block diagram of an electronic device including an additional line on a printed circuit board (PCB) according to various embodiments.

FIG. 4 is a block diagram of an electronic device including an additional line on a printed circuit board (PCB) according to various embodiments.

Referring to FIG. 4, at least one of the control circuit 210, the memory 220, the communication module 230, the tuner 240, and the antenna 250 may be mounted on a PCB. When the components illustrated in FIG. 4 are connected through lines on the PCB, the PCB may be composed of at least one layer. When the PCB is composed of a plurality of layers, a first line 450 interposed between the communication module 230 and the antenna 250 may be formed between the plurality of layers. For another example, the first line 450 may be formed in the inner layer of the layer or the outer layer of the layer. The third signal (e.g., reference numeral 253 in FIG. 2) output from the transmission/reception module 234 may be delivered to the antenna 250 through the first line 450. The fourth signal (e.g., reference numeral 254 in FIG. 2) reflected from the antenna 250 may be delivered to the transmission/reception module 234 through the first line 450.

According to an embodiment, the electronic device 101 may include a second line 460 on the PCB such that at least part (e.g., reference number 452) of the second signal obtained by combining the third signal and the fourth signal is coupled. For example, the second line 460 may be disposed in parallel with the first line 450 on the same layer. For another example, the second line 460 may be disposed in parallel with the first line 450 on different layers. For another example, the second line 460 may include a conductive via that penetrates through a plurality of layers.

Figure 5:
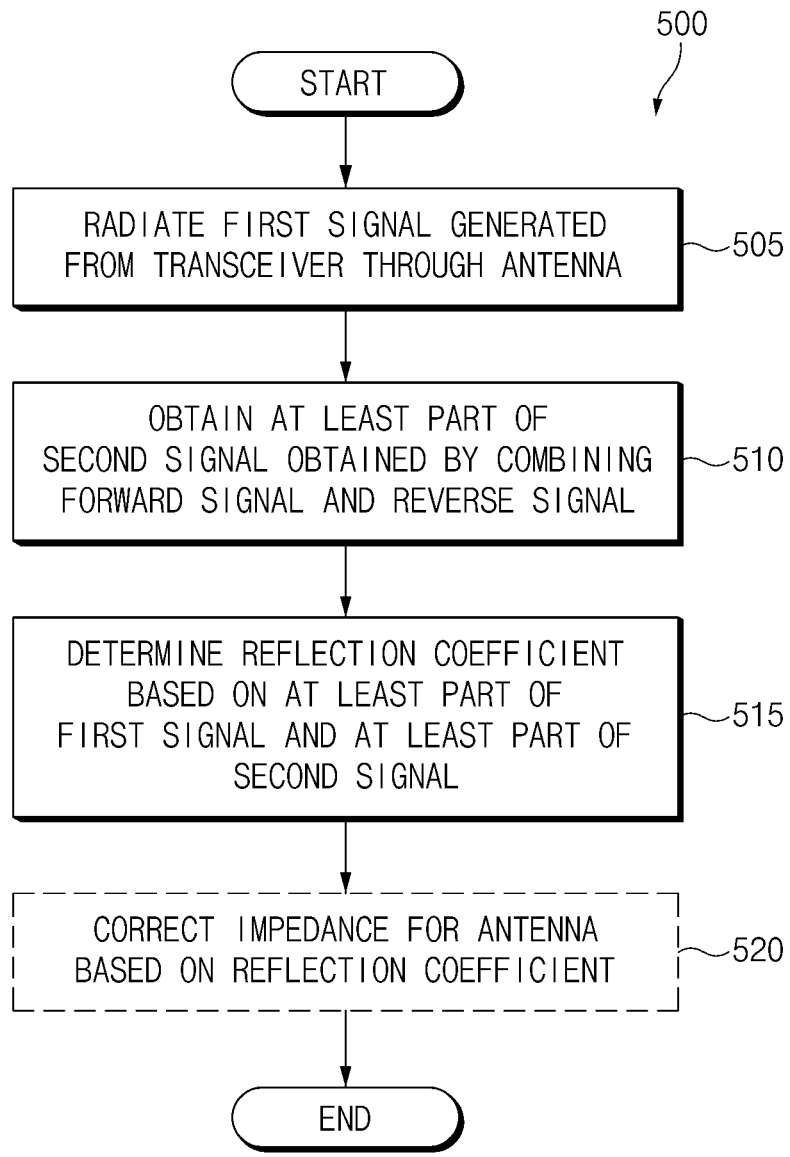
FIG. 5 is an operation flowchart of an electronic device for determining a reflection coefficient based on a signal obtained by combining a forward signal and a reverse signal, according to various embodiments.

FIG. 5 is an operation flowchart of an electronic device for determining a reflection coefficient based on a signal obtained by combining a forward signal and a reverse signal, according to various embodiments. The operations illustrated in FIG. 5 may be implemented by the electronic device 101 or the control circuit 210.

Referring to FIG. 5, in operation 505 of a method 500, the control circuit 210 may radiate a first signal generated from the transceiver 232 through the antenna 250. According to an embodiment, the transceiver may include RFIC. According to an embodiment, the control circuit 210 may be disposed separately from the transceiver 232 or may be embedded in the transceiver 232.

In operation 510, the control circuit 210 (or the transceiver 232) may obtain at least part of the second signal obtained by combining a forward signal (e.g., the third signal) delivered to an antenna and a reverse signal (e.g., the fourth signal) reflected from the antenna. For example, the control circuit 210 may obtain at least part of the second signal through the passive element 260 interposed between the transceiver 232 and the antenna 250. For another example, the control circuit 210 may obtain at least part of the second signal through the switch 360 interposed between the plurality of transmission/reception modules 235 and 236 and the antenna 250. For another example, the control circuit 210 may obtain at least part of the second signal through a line (or wire) disposed on the PCB.

In operation 515, the control circuit 210 (or the transceiver 232) may determine the reflection coefficient for the antenna 250 based on at least part of the first signal and at least part of the second signal. According to an embodiment, the control circuit 210 may determine a reflection coefficient based on at least part of the first signal, at least part of the obtained second signal, and a look-up table indicating a ratio between the first signal and the second signal. According to an embodiment, the look-up table may be determined based on Equation 1 below.

$$\frac{b_4}{b_3} = \frac{S_{rev}(t)}{S_{fwd}(t)} \propto \frac{S_{coupled}(t)}{S_{original}(t)} \qquad \text{[Equation 1]}$$

In Equation 1, $b_4/b_3$ may denote a reflection coefficient for the antenna 250; $S_{fwd}(t)$ may denote a forward signal (i.e., the third signal) delivered to the antenna 250; and $S_{rev}(t)$ may denote a reverse signal (i.e., the fourth signal) reflected from the antenna 250. $S_{original}(t)$ may denote the signal (i.e., the first signal) output from the transceiver 232; and $S_{coupled}(t)$ may denote the signal (i.e., the second signal) obtained by combining the forward signal and the reverse signal. The ratio between signals may mean the difference between phases or magnitudes of signals. The reflection coefficient $b_4/b_3$ may be the same as or similar to $S_{rev}(t)/S_{fwd}(t)$. Because the second signal includes the component of the reverse signal, $S_{coupled}(t)/S_{original}(t)$ may be proportional to the reflection coefficient or $S_{rev}(t)/S_{fwd}(t)$. According to the above-described principle, the control circuit 210 may determine the reflection coefficient based on a look-up table indicating the ratio of the first signal and the second signal. For example, the look-up table may indicate the change amount of the ratio between the first signal and the second signal according to the load change amount of the antenna 250.

According to an embodiment, in operation 520, the control circuit 210 may correct the impedance for the antenna 250 based on the determined reflection coefficient. According to the above-described method, the electronic device 101 may secure a mounting space of the electronic device 101 by preventing the performance of the antenna 250 from being degraded without using a bidirectional coupler.

Figure 6:
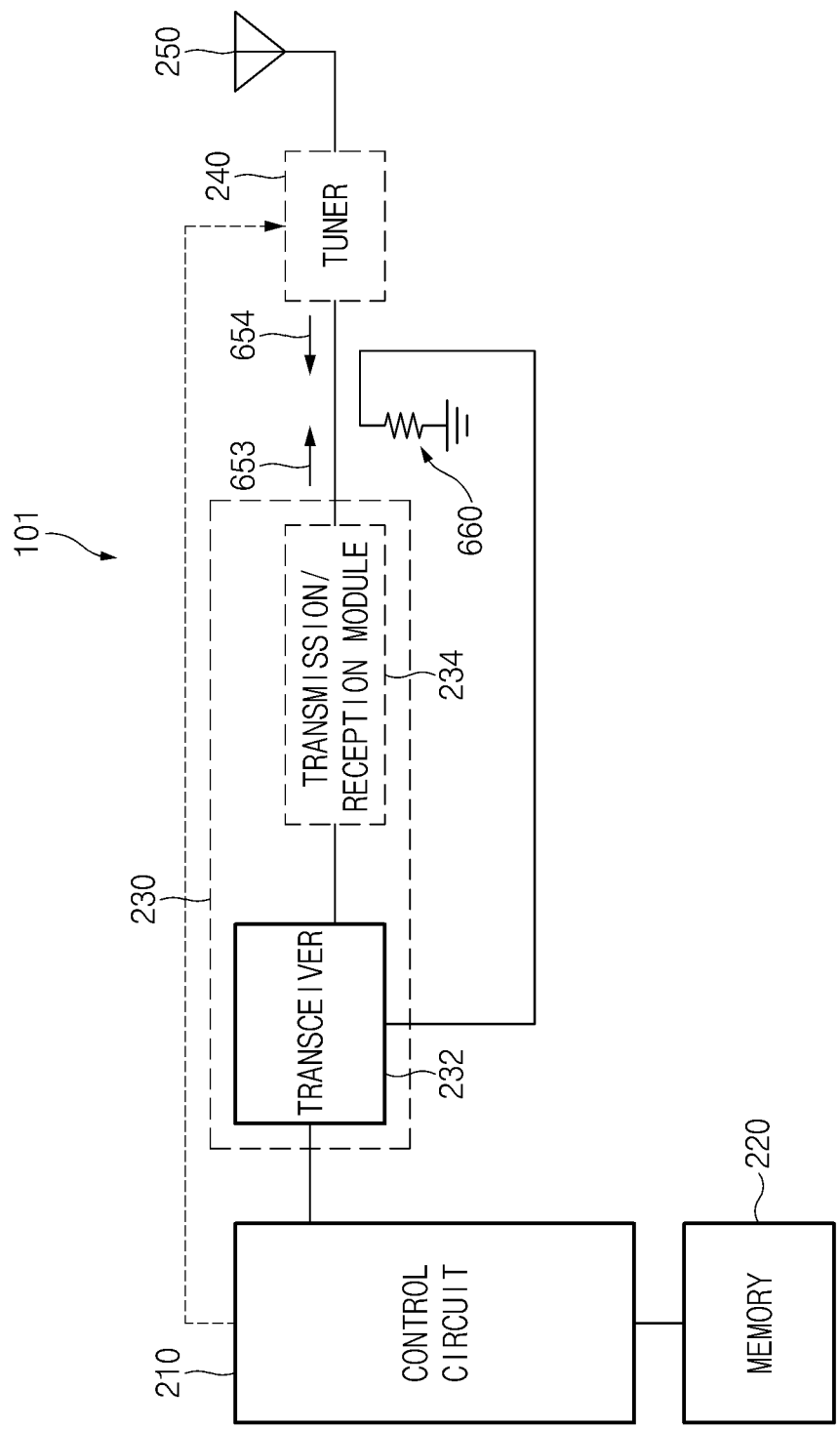
FIG. 6 is a block diagram of an electronic device for obtaining a forward signal or a reverse signal according to various embodiments.

FIG. 6 is a block diagram of an electronic device for obtaining a forward signal or a reverse signal according to various embodiments.

Referring to FIG. 6, the electronic device 101 may include a unidirectional coupler for obtaining at least part of a third signal or a fourth signal between the communication module 230 and the antenna 250 (or the tuner 240). For example, the unidirectional coupler may include a resistor 660 connected to ground (GND). For example, the value of the resistor 660 may be ohms.

According to an embodiment, the control circuit 210 (or the transceiver 232) may obtain at least part of the third signal (e.g., reference numeral 653) through a unidirectional coupler. For another example, the control circuit 210 (or the transceiver 232) may obtain at least part of the fourth signal (e.g., reference numeral 654) through the unidirectional coupler. The control circuit 210 (or the transceiver 232) may determine the reflection coefficient based on the ratio between a signal obtained through the unidirectional coupler and the first signal (e.g., reference numeral 251 in FIG. 2). According to an embodiment, the control circuit 210 may correct the impedance of the antenna 250 through the tuner 240 based on the determined reflection coefficient.

Figure 7:
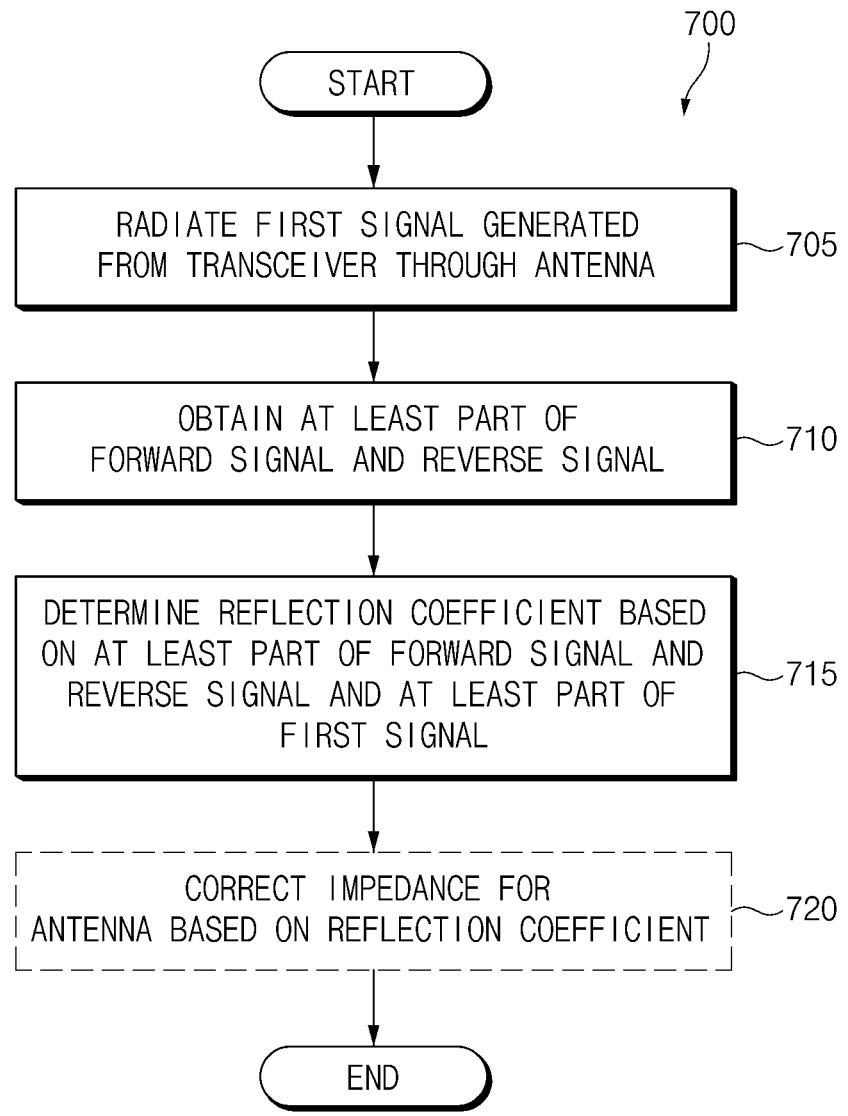
FIG. 7 is an operation flowchart of an electronic device for determining a reflection coefficient based on a forward signal or a reverse signal, according to various embodiments.

FIG. 7 is an operation flowchart of an electronic device for determining a reflection coefficient based on a forward signal or a reverse signal, according to various embodiments. The operations illustrated in FIG. 7 may be implemented by the electronic device 101 or the control circuit 210.

Referring to FIG. 7, in operation 705 of a method 700, the control circuit 210 may radiate a first signal generated from the transceiver 232 through the antenna 250. In operation 710, the control circuit 210 (or the transceiver 232) may obtain at least part of one signal among a forward signal (e.g., the third signal) delivered to an antenna and a reverse signal (e.g., the fourth signal) reflected from the antenna. For example, the control circuit 210 may obtain at least part of the third signal or the fourth signal through the unidirectional coupler.

In operation 715, the control circuit 210 may determine a reflection coefficient for the antenna 250 based on at least part of the third signal or the fourth signal and at least part of the first signal. According to an embodiment, the control circuit 210 may determine the reflection coefficient based on a look-up table indicating the ratio between the first signal and the third signal or the ratio between the first signal and the fourth signal. According to an embodiment, the look-up table may be determined based on Equation 2 below.

[Equation 2]

$$\frac{b_4}{b_3} \propto \frac{S_{fwd}(t)}{S_{original}(t)} \quad (1)$$

$$\frac{b_4}{b_3} \propto \frac{S_{rev}(t)}{S_{original}(t)} \quad (2)$$

In Equation 2, $b_4/b_3$ may denote the reflection coefficient for the antenna 250; $S_{fwd}(t)$ may denote the third signal; $S_{rev}(t)$ may denote the fourth signal; and $S_{original}(t)$ may denote the first signal. The ratio between signals may mean the difference between phases or magnitudes of signals. The change amount of $S_{fwd}(t)/S_{original}(t)$ or $S_{rev}(t)/S_{original}(t)$ according to the load change amount of the antenna 250 may be proportional to the reflection coefficient. According to Equation 2 (1) or Equation 2 (2) described above, the control circuit 210 may determine the reflection coefficient based on a look-up table indicating the ratio between the first signal and the third signal or the ratio between the first signal and the fourth signal. For example, the look-up table may indicate the ratio between the first signal and the third signal according to the load change amount of the antenna 250 or may indicate the ratio of the first signal and the fourth signal according to the load change amount of the antenna 250.

According to an embodiment, in operation 720, the control circuit 210 may correct the impedance for the antenna 250 based on the determined reflection coefficient. According to the above-described method, the electronic device 101 may secure a mounting space of the electronic device 101 by preventing the performance of the antenna 250 from being degraded without using a bidirectional coupler.

According to an embodiment, the electronic device 101 may determine the reflection coefficient for the antenna 250 based on the third signal or the fourth signal and the second signal. For example, the electronic device 101 may obtain at least part of the second signal based on the structure of the electronic device 101 illustrated in FIGS. 2 to 4 and may obtain at least part of the third signal or the fourth signal based on the structure of the electronic device 101 illustrated in FIG. 6. The relationship between the second signal, the third signal, and the fourth signal may be expressed by Equation 3 below.

$$S_{coupled}(t) = k(S_{rex}(t) + S_{fwd}(t)) \quad \text{[Equation 3]}$$

In Equation 3, $S_{coupled}(t)$ may denote the second signal; $S_{fwd}(t)$ may denote the third signal; and $S_{rev}(t)$ may denote the fourth signal. 'k' may be a constant. According to Equation 3, because the second signal is capable of being expressed as the sum of the third signal and the fourth signal, the reflection coefficient for the antenna 250 may be expressed by Equation 4 below.

[Equation 4]

$$\frac{b_4}{b_3} = \frac{S_{rev}(t)}{S_{fwd}(t)} = \frac{S_{rev}(t)}{\frac{S_{coupled}(t)}{k} - S_{rev}(t)} \quad (1)$$

$$\frac{b_4}{b_3} = \frac{S_{rev}(t)}{S_{fwd}(t)} = \frac{\frac{S_{coupled}(t)}{k} - S_{fwd}(t)}{S_{fwd}(t)} \quad (2)$$

The control circuit 210 may determine the reflection coefficient based on the second signal and the fourth signal, using (1) of Equation 4, or may determine the reflection coefficient based on the second signal and the third signal, using (2) of Equation 4.

As described above, an electronic device (e.g., the electronic device 101 of FIG. 1) may include an antenna (e.g., the antenna 250 of FIG. 2), a communication module (e.g., the communication module 230 of FIG. 2) including a transceiver, and a control circuit (e.g., the control circuit 210 of FIG. 2). The control circuit may be configured to radiate a first signal generated from the transceiver through the antenna, to obtain at least part of a second signal obtained by combining a forward signal delivered from the communication module to the antenna and a reverse signal reflected from the antenna, and to determine a reflection coefficient for the antenna based on at least part of the first signal and at least part of the second signal.

According to an embodiment, the electronic device may further include a memory (e.g., the memory 220). The control circuit may be configured to determine the reflection coefficient based at least on a look-up table indicating a ratio between the first signal and the second signal, which are stored in the memory.

According to an embodiment, the electronic device may further include a passive element (e.g., the passive element 260 of FIG. 2) between the communication module and the antenna. The control circuit may be configured to obtain at least part of the second signal through the passive element.

According to an embodiment, the communication module may further include a first transmission/reception module (e.g., the first transmission/reception module 235 of FIG. 3) corresponding to a first frequency band and a second transmission/reception module (e.g., the second transmission/ reception module 236 of FIG. 3) corresponding to a second frequency band, the electronic device may further include a switch (e.g., the switch 360 of FIG. 3) between the communication module and the antenna. The control circuit may be configured to obtain at least part of the second signal through a port, which is not connected to the first transmission/reception module and the second transmission/reception module, from among a plurality of ports included in the switch.

According to an embodiment, the communication module may further include a first line interposed between the communication module and the antenna and a second line (e.g., the second line 460 of FIG. 4) disposed separately from the first line. The control circuit may be configured to obtain at least part of the second signal through the second line.

According to an embodiment, the communication module may include a printed circuit board (PCB). The second line may be disposed on the same layer as the first line, on a layer over the first line, or on a layer under the first line, on the PCB.

According to an embodiment, the communication module may further include a tuner (e.g., the tuner 240 of FIG. 2) between the communication module and the antenna. The control circuit may be configured to correct impedance for the antenna based on the determined reflection coefficient through the tuner.

According to an embodiment, the transceiver may include a radio frequency integrated circuit (RFIC).

As described above, a method of an electronic device (e.g., the electronic device 101 of FIG. 1) may include radiating a first signal generated from a transceiver, through an antenna, obtaining at least part of a second signal obtained by combining a forward signal delivered to the antenna and a reverse signal reflected from the antenna, and determining a reflection coefficient for the antenna based on at least part of the first signal and at least part of the second signal.

According to an embodiment, the determining of the reflection coefficient may include determining the reflection coefficient based on a look-up table indicating a ratio between the first signal and the second signal.

According to an embodiment, the obtaining of the at least part of the second signal may include obtaining at least part of the second signal through a passive element interposed between a communication module including the transceiver and the antenna.

According to an embodiment, the obtaining of the at least part of the second signal may include obtaining at least part of the second signal through a port of a switch interposed between a communication module including the transceiver and the antenna.

According to an embodiment, the obtaining of the at least part of the second signal may include obtaining at least part of the second signal through a first line interposed between a communication module including the transceiver and the antenna and a second line disposed separately from the first line.

According to an embodiment, the second line may be disposed on the same layer as the first line, on a layer over the first line, or on a layer under the first line.

According to an embodiment, the method may further include correcting impedance for the antenna based on the determined reflection coefficient.

As described above, an electronic device (e.g., the electronic device 101 of FIG. 1) may include an antenna (e.g., the antenna 250 of FIG. 2), a communication module (e.g., the communication module 230 of FIG. 2) including a transceiver, and a control circuit (e.g., the control circuit 210 of FIG. 2). The control circuit may be configured to radiate a first signal generated from the transceiver through the antenna, to obtain at least part of one signal among a forward signal delivered from the communication module to the antenna and a reverse signal reflected from the antenna, and to determine a reflection coefficient for the antenna based on at least part of the forward signal and the reverse signal and at least part of the first signal.

According to an embodiment, the electronic device may further include a memory (e.g., the memory 220 of FIG. 2). The control circuit may be configured to determine the reflection coefficient based on a look-up table indicating a ratio between the first signal and the forward signal or the reverse signal, which is stored in the memory.

According to an embodiment, the electronic device may further include a first line interposed between the communication module and the antenna, a second line disposed separately from the first line, and a resistor (e.g., the resistor 660 of FIG. 6) connected to the second line. The control circuit may be configured to obtain at least part of the forward signal or the reverse signal through the resistor.

According to an embodiment, the communication module may further include a tuner (e.g., the tuner 240 of FIG. 2) between the communication module and the antenna.

The control circuit may be configured to correct impedance for the antenna based on the determined reflection coefficient through the tuner.

According to an embodiment, the transceiver may include RFIC.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
an antenna;
a communication module including a transceiver; and
a control circuit,
wherein the control circuit is configured to:
radiate a first signal generated from the transceiver through the antenna;
obtain at least part of a second signal obtained by combining a forward signal delivered from the communication module to the antenna and a reverse signal reflected from the antenna; and
determine a reflection coefficient for the antenna based on at least part of the first signal and at least part of the second signal.

2. The electronic device of claim 1, further comprising:
a memory,
wherein the control circuit is configured to:
determine the reflection coefficient based at least on a look-up table indicating a ratio between the first signal and the second signal, which are stored in the memory.

3. The electronic device of claim 2, further comprising:
a passive element between the communication module and the antenna,
wherein the control circuit is configured to:
obtain the at least part of the second signal through the passive element.

4. The electronic device of claim 2, wherein the communication module further includes a first transmission/reception module corresponding to a first frequency band and a second transmission/reception module corresponding to a second frequency band,
further comprising:
a switch between the communication module and the antenna,
wherein the control circuit is configured to:
obtain the at least part of the second signal through a port, which is not connected to the first transmission/reception module and the second transmission/reception module, from among a plurality of ports included in the switch.

5. The electronic device of claim 2, further comprising:
a first line interposed between the communication module and the antenna and a second line disposed separately from the first line,
wherein the control circuit is configured to:
obtain the at least part of the second signal through the second line.

6. The electronic device of claim 5, wherein the communication module includes a printed circuit board (PCB), and
wherein the second line is disposed on the same layer as the first line, on a layer over the first line, or on a layer under the first line, on the PCB.

7. The electronic device of claim 1, further comprising:
a tuner between the communication module and the antenna,
wherein the control circuit is configured to:
correct impedance for the antenna based on the determined reflection coefficient through the tuner.

8. The electronic device of claim 1, wherein the transceiver includes a radio frequency integrated circuit (RFIC).

9. A method of an electronic device, the method comprising:
radiating a first signal generated from a transceiver, through an antenna;
obtaining at least part of a second signal obtained by combining a forward signal delivered to the antenna and a reverse signal reflected from the antenna; and
determining a reflection coefficient for the antenna based on at least part of the first signal and at least part of the second signal.

10. The method of claim 9, wherein the determining of the reflection coefficient includes:
    determining the reflection coefficient based on a look-up table indicating a ratio between the first signal and the second signal.

11. The method of claim 10, wherein the obtaining of the at least part of the second signal includes:
    obtaining the at least part of the second signal through a passive element interposed between a communication module including the transceiver and the antenna.

12. The method of claim 10, wherein the obtaining of the at least part of the second signal includes:
    obtaining the at least part of the second signal through a port of a switch interposed between a communication module including the transceiver and the antenna.

13. The method of claim 10, wherein the obtaining of the at least part of the second signal includes:
    obtaining the at least part of the second signal through a first line interposed between a communication module including the transceiver and the antenna and a second line disposed separately from the first line.

14. The method of claim 13, wherein the second line is disposed on the same layer as the first line, on a layer over the first line, or on a layer under the first line.

15. The method of claim 9, further comprising:
    correcting impedance for the antenna based on the determined reflection coefficient.

\* \* \* \* \*